(12) United States Patent
Zheng

(10) Patent No.: US 12,044,918 B2
(45) Date of Patent: Jul. 23, 2024

(54) DISPLAY MODULE AND DISPLAY DEVICE

(71) Applicant: TCL CHINA STAR OPTOELECTRONICS TECHNOLOGY CO., LTD., Shenzhen (CN)

(72) Inventor: Feng Zheng, Shenzhen (CN)

(73) Assignee: TCL CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/765,191

(22) PCT Filed: Mar. 15, 2022

(86) PCT No.: PCT/CN2022/080860
§ 371 (c)(1),
(2) Date: Mar. 30, 2022

(87) PCT Pub. No.: WO2023/168730
PCT Pub. Date: Sep. 14, 2023

(65) Prior Publication Data
US 2024/0053630 A1 Feb. 15, 2024

(30) Foreign Application Priority Data

Mar. 7, 2022 (CN) .......................... 202210217398.9

(51) Int. Cl.
G02F 1/1333 (2006.01)
G02F 1/1335 (2006.01)

(52) U.S. Cl.
CPC .... *G02F 1/13336* (2013.01); *G02F 1/133526* (2013.01); *G02F 2202/28* (2013.01)

(58) Field of Classification Search
None
See application file for complete search history.

(56) References Cited

U.S. PATENT DOCUMENTS 6,262,785 B1 7/2001 Kim
2010/0277665 A1 11/2010 Kuo et al.
(Continued)

FOREIGN PATENT DOCUMENTS

CN 101587670 A 11/2009
CN 102257549 A 11/2011
(Continued)

OTHER PUBLICATIONS

PCT International Search Report for International Application No. PCT/CN2022/080860, mailed on Jul. 1, 2022, 10pp.
(Continued)

*Primary Examiner* — Phu Vu
(74) *Attorney, Agent, or Firm* — The Roy Gross Law Firm, LLC; Roy Gross

(57) ABSTRACT

The present application provides a display module and a display device. The display module comprises at least two display panels, two adjacent display panels are spliced along a first direction or a second direction, and the first direction is different from the second direction. The display module further comprises a groove disposed between two adjacent display panels and a convex lens portion disposed in the groove. At least one convex portion is disposed on one side of the convex lens portion away from bottom of the groove.

17 Claims, 4 Drawing Sheets

(56) References Cited

U.S. PATENT DOCUMENTS

| | | | | |
|---|---|---|---|---|
| 2015/0286457 A1* | 10/2015 | Kim | ................. | G06F 3/1446 |
| | | | | 345/1.3 |
| 2016/0363291 A1* | 12/2016 | Sun | ................. | G02B 5/0278 |
| 2017/0086308 A1* | 3/2017 | Large | ................. | H05K 5/0017 |
| 2018/0113320 A1* | 4/2018 | Lee | ................. | G02F 1/13336 |
| 2019/0086703 A1* | 3/2019 | Wang | ................. | G02F 1/13336 |

FOREIGN PATENT DOCUMENTS

| | | |
|---|---|---|
| CN | 202956999 U | 5/2013 |
| CN | 104978901 A | 10/2015 |
| CN | 205845413 U | 12/2016 |
| CN | 109785753 A | 5/2019 |
| CN | 111063265 A | 4/2020 |
| CN | 113096547 A | 7/2021 |

OTHER PUBLICATIONS

PCT Written Opinion of the International Search Authority for International Application No. PCT/CN2022/080860, mailed on Jul. 1, 2022, 7pp.

PCT Chinese Office Action issued in corresponding Chinese Patent Application No. 202210217398.9 dated May 25, 2023, pp. 1-8, 19pp.

* cited by examiner

DISPLAY MODULE AND DISPLAY DEVICE

CROSS REFERENCE TO RELATED APPLICATIONS

This application is a National Phase of PCT Patent Application No. PCT/CN2022/080860 having International filing date of Mar. 15, 2022, which claims the benefit of priority of Chinese Patent Application No. 202210217398.9, filed Mar. 7, 2022, the contents of which are all incorporated herein by reference in their entirety.

TECHNICAL FIELD

The present application relates to a technical field of display, and in particular, to a display module and a display device having the same.

BACKGROUND

A liquid crystal display (LCD) is a flat panel display (FPD) that displays an image using characteristics of a liquid crystal material, and has advantages such as lightness and thinness, low driving voltage, and low power consumption.

At present, small-size display devices, such as mobile phone screens, can be molded and manufactured at one time in industry. Due to limited size of an equipment, for medium and large-size splicing screens, a larger size can only be achieved by splicing multiple screens. However, in current splicing LCD, images cannot be displayed at a splicing seam, resulting in the generation of a black seam, which seriously affects display effects of a splicing LCD.

Technical Problem

Embodiments of the present application provide a display module and a display device, which can enable two adjacent display panels to emit light therebetween, so as to eliminate a splicing seam between two display modules and improve display effects of display modules.

Technical Solution

The present application provides a display module, wherein the display module comprises at least two display panels, two adjacent display panels are spliced along a first direction or a second direction, and the first direction is different from the second direction;
the display module comprises a display area comprising a conventional display area of each of the display panels and a splicing display area between two adjacent conventional display areas, and the conventional display area comprises a first sub-area and a second sub-area between the first sub-area and the splicing display area;
the display module further comprises a groove disposed between two adjacent display panels and located in the second sub-region and the splicing display area, and a convex lens portion disposed in the groove; and
wherein at least one convex portion is disposed on one side of the convex lens portion away from bottom of the groove, and an orthographic projection of the convex lens portion on two adjacent display panels covers the second sub-area and the splicing display area.

In an embodiment of the present application, an orthographic projection of at least one convex portion on two adjacent display panels covers the second sub-area and the splicing display area.

In an embodiment of the present application, the convex lens portion is disposed with a plurality of convex portions on one side away from bottom of the groove, and distribution density of the plurality of convex portions gradually increases in a direction close to a splicing position between the two adjacent display panels.

In an embodiment of the present application, the convex lens portion comprises an adhesive layer disposed in the groove and a convex lens disposed on the adhesive layer, and the convex lens is attached to the groove through the adhesive layer, and the convex lens is disposed with at least one convex portion on one side away from the adhesive layer.

In an embodiment of the present application, an end portion of the convex lens on one side away from the adhesive layer is flush with a surface of the display panel in the first sub-region.

In an embodiment of the present application, each of the display panels comprises a first flexible substrate and a second flexible substrate disposed opposite to each other, a first functional substrate disposed on one side of the first flexible substrate away from the second flexible substrate and located in the first sub-region, and a second functional substrate disposed on one side of the second flexible substrate away from the first flexible substrate and located in the first sub-region; and
wherein the first flexible substrate and the second flexible substrate are disposed in the conventional display area and extend to the splicing display area, the convex lens portion is disposed on one side of the first flexible substrate away from the second flexible substrate, and the end portion of the convex lens on one side away from the adhesive layer is flush with a surface of one side of the first functional substrate away from the second functional substrate.

In an embodiment of the present application, each of the display panels further comprises a liquid crystal layer and a retaining wall disposed between the first flexible substrate and the second flexible substrate; and
wherein parts of the first flexible substrate and the second flexible substrate in the splicing display area bend and extend in a direction away from the first functional substrate, and the retaining wall is disposed on one side of the splicing display area close to the conventional display area, so that the liquid crystal layer is disposed in the conventional display area.

In an embodiment of the present application, one side of the convex lens close to the adhesive layer is a flat surface or an arc surface.

In an embodiment of the present application, a material of the convex lens comprises polymethyl methacrylate, polycarbonate, polyoxymethylene, or polypropylene.

According to the above objects of the present application, a display device is provided, wherein the display device comprises a display module and a backlight assembly, the display module comprises at least two display panels, two adjacent display panels are spliced along a first direction or a second direction, and the first direction is different from the second direction;
the display module comprises a display area comprising a conventional display area of each of the display panels and a splicing display area between two adjacent conventional display areas, and the conventional display area comprises a first sub-area and a second sub-area between the first sub-area and the splicing display area;
the display module further comprises a groove disposed between two adjacent display panels and located in the second sub-region and the splicing display area, and a convex lens portion disposed in the groove;

wherein at least one convex portion is disposed on one side of the convex lens portion away from bottom of the groove, and an orthographic projection of the convex lens portion on two adjacent display panels covers the second sub-area and the splicing display area; and the backlight assembly is disposed on one side of the display panel away from the convex lens portion.

In an embodiment of the present application, an orthographic projection of at least one convex portion on two adjacent display panels covers the second sub-area and the splicing display area.

In an embodiment of the present application, the convex lens portion is disposed with a plurality of convex portions on one side away from bottom of the groove, and distribution density of the plurality of convex portions gradually increases in a direction close to a splicing position between the two adjacent display panels.

In an embodiment of the present application, the convex lens portion comprises an adhesive layer disposed in the groove and a convex lens disposed on the adhesive layer, and the convex lens is attached to the groove through the adhesive layer, and the convex lens is disposed with at least one convex portion on one side away from the adhesive layer.

In an embodiment of the present application, an end portion of the convex lens on one side away from the adhesive layer is flush with a surface of the display panel in the first sub-region.

In an embodiment of the present application, each of the display panels comprises a first flexible substrate and a second flexible substrate disposed opposite to each other, a first functional substrate disposed on one side of the first flexible substrate away from the second flexible substrate and located in the first sub-region, and a second functional substrate disposed on one side of the second flexible substrate away from the first flexible substrate and located in the first sub-region; and wherein the first flexible substrate and the second flexible substrate are disposed in the conventional display area and extend to the splicing display area, the convex lens portion is disposed on one side of the first flexible substrate away from the second flexible substrate, and the end portion of the convex lens on one side away from the adhesive layer is flush with a surface on one side of the first functional substrate away from the second functional substrate.

In an embodiment of the present application, each of the display panels further comprises a liquid crystal layer and a retaining wall disposed between the first flexible substrate and the second flexible substrate; and wherein parts of the first flexible substrate and the second flexible substrate in the splicing display area bend and extend in a direction away from the first functional substrate, and the retaining wall is disposed on one side of the splicing display area close to the conventional display area, so that the liquid crystal layer is disposed in the conventional display area.

In an embodiment of the present application, one side of the convex lens close to the adhesive layer is a flat surface or an arc surface.

In an embodiment of the present application, a material of the convex lens comprises polymethyl methacrylate, polycarbonate, polyoxymethylene, or polypropylene.

TECHNICAL EFFECTS

Compared with the prior art, in the present application, a convex lens portion is disposed between two display panels which are spliced, and light in the conventional display area of the display panel can be further converged into a splicing display area by utilizing light-gathering effect of the convex lens portion, so that the splicing display area of the display module can also emit light, thereby eliminating a splicing seam between two display modules and improving display effects of the display module.

BRIEF DESCRIPTION OF THE DRAWINGS

The technical solutions and other beneficial effects of the present application will be apparent from the detailed description of specific embodiments of the present application with reference to the accompanying drawings.

DETAILED DESCRIPTION

Hereinafter, technical solution in embodiments of the present application will be clearly and completely described with reference to the accompanying drawings in embodiments of the present application. Apparently, the described embodiments are part of, but not all of, the embodiments of the present application. All the other embodiments, obtained by a person with ordinary skill in the art on the basis of the embodiments in the present application without expenditure of creative labor, belong to the protection scope of the present application.

The following disclosure provides many different embodiments or examples for implementing different structures of the present application. In order to simplify the disclosure of the present application, components and arrangements of specific examples are described below. Of course, they are merely examples and are not intended to limit the present application. Furthermore, in the present application, reference numbers and/or reference letters may be used repeatedly in different examples, such repetition is for purpose of simplification and clarity, which does not in itself indicate relationships between the various embodiments and/or arrangements discussed. In addition, the present application provides examples of various specific processes and materials, but those skilled in the art may recognize the application of other processes and/or the use of other materials.

Figure 1:
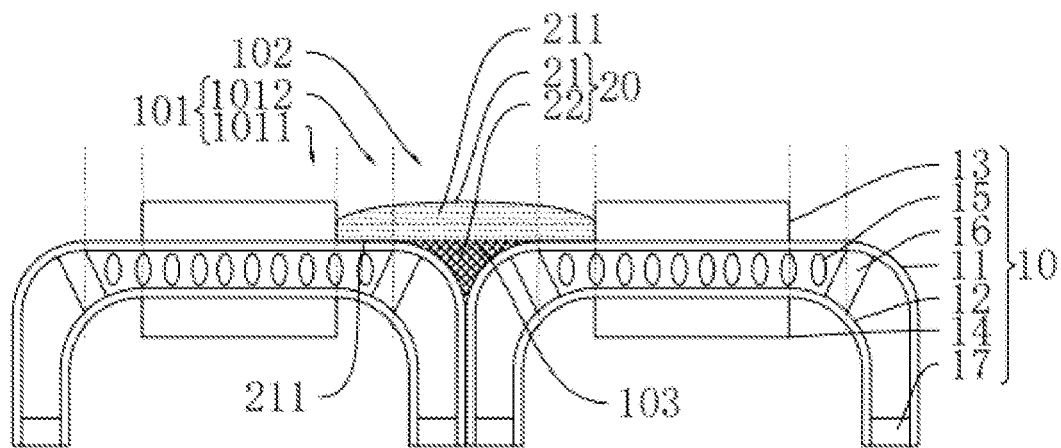
FIG. 1 is a schematic structural diagram of a display module according to an embodiment of the present application.

An embodiment of the present application provides a display module. Referring to FIG. 1, the display module comprises at least two display panels 10, two adjacent display panels 10 are spliced along a first direction or a second direction, and the first direction is different from the second direction.

The display module comprises a display area comprising a conventional display area 101 of each of the display panels and a splicing display area 102 between two adjacent conventional display areas 101, and the conventional display area 101 comprises a first sub-area 1011 and a second sub-area 1012 between the first sub-area 1011 and the splicing display area 102.

Further, the display module further comprises a groove 103 disposed between two adjacent display panels 10 and located in the second sub-region 1012 the splicing display area 102, and a convex lens portion 20 disposed in the groove 103.

Wherein, at least one convex portion 211 is disposed on one side of the convex lens portion 20 away from bottom of the groove 103, and an orthographic projection of the convex lens portion 20 on two adjacent display panels 10 covers the second sub-area 1012 and the splicing display area 102.

In the process of implementation and application, in an embodiment of the present application, the convex lens portion 20 is disposed between two display panels 10 that are spliced with each other, and an orthographic projection of the convex lens portion 20 on two adjacent display panels 10 covers the second sub-area 1012 and the splicing display area 102. Further, at least one convex portion 211 is disposed on the side of the convex lens portion 20 away from the display panel 10. Thus, light-gathering effect of the convex lens portion 20 can be utilized to converge light in the conventional display area 101 of the display panel into a splicing display area 102, so that a splicing position of two display panels 10 that are spliced to each other can also emit light, thereby eliminating a splicing seam and improving display effects of the display module.

Continuing to refer to FIG. 1, the display module provided in embodiments of the present application comprises at least two display panels 10, and two adjacent display panels 10 are spliced along a first direction or a second direction. In embodiments of the present application, the first direction may be perpendicular to the second direction. It should be noted that only two display panels 10 which are spliced together are shown in FIG. 1 for illustration.

The display module comprises a display area, and the display area comprises a conventional display area 101 of each of the display panels 10 and a splicing display area 102 between two adjacent conventional display areas 101. It can be understood that the conventional display area 101 is an area where each display panel 10 can normally emit light, and the splicing display area 102 is an area where two adjacent display panels 102 are spliced, and the display panel 10 corresponding to the splicing display area 102 does not have a light-emitting function. Further, the conventional display area 101 comprises a first sub-area 101 and a second sub-area 1012 between the first sub-area 1011 and the splicing display area 102.

In embodiments of the present application, each of the display panels 10 comprises a first flexible substrate 11 and a second flexible substrate 12 disposed opposite to each other, a first functional substrate 13 disposed on one side of the first flexible substrate 11 away from the second flexible substrate 12, a second functional substrate 14 disposed on one side of the second flexible substrate 12 away from the first flexible substrate 11, and a liquid crystal layer 15, a retaining wall 16, and a light shielding portion 17 disposed between the first flexible substrate 11 and the second flexible substrate 12.

Wherein, a portion of the first flexible substrate 11 in the conventional display area 101 has a flat structure, a portion of the first flexible substrate 11 in the splicing display area 102 bends and extends in a direction away from the first functional substrate 13. Similarly, a portion of the second flexible substrate 12 in the conventional display area 101 has a flat structure, and a portion of the second flexible substrate 12 in the splice display area 102 bends and extends in a direction away from the first functional substrate 13. Further, the first functional substrate 13 is disposed on one side of the first flexible substrate 11 away from the second flexible substrate 12 and is located in the first sub-region 1011, and the second functional substrate 14 is disposed on one side of the second flexible substrate 12 away from the first flexible substrate 11 and is located in the first sub-region 1011. One display panel 10 is connected to a bent first flexible substrate 11 of another adjacent display panel 10 through a bent first flexible substrate 11 to form the splicing display area 102.

It should be noted that each of the display panels 10 further comprises a thin film transistor array layer, an electrode layer, an alignment layer, etc disposed on one side of the second flexible substrate 12 close to the first flexible substrate 11, and a color filter layer, an electrode layer, an alignment layer, etc disposed on one side of the first flexible substrate 11 close to the second flexible substrate 12. The first functional substrate 13 comprises a first glass substrate disposed on one side of the first flexible substrate 11 away from the second flexible substrate 12 and a first polarizer disposed on one side of the first glass substrate away from the first flexible substrate. The second functional substrate 14 comprises a second glass substrate disposed on one side of the second flexible substrate 12 away from the first flexible substrate 11 and a second polarizer disposed on one side of the second glass substrate away from the second flexible substrate.

In embodiments of the present application, the retaining wall 16 is disposed on one side of the splicing display area 102 close to the conventional display area 101 to limit the liquid crystal layer 15 within the conventional display area 101. The retaining wall 16 may be made of sealant, at the time of limiting the liquid crystal layer 15, the first flexible substrate 11 and the second flexible substrate may be bonded together; or the retaining wall may be made of other organic resin materials, and sealant can be disposed on one side of the retaining wall 16 to bond the first flexible substrate 11 and the second flexible substrate 12. The light shielding portion 17 may be made of a black photoresist material, which may further serve to prevent light leakage and prevent foreign matter from entering the display panel 10.

The display module provided in embodiments of the present application further comprises a groove 103 disposed between two adjacent display panels 10 located in the second sub-region 1012 and the splicing display area 102, and a convex lens portion 20 disposed in the groove 103. Wherein, at least one convex portion 211 is disposed on one side of the convex lens portion 20 away from bottom of the groove 103 to play a role of gathering light, and an orthographic projection of the convex lens portion 20 on two adjacent display panels 10 covers the second sub-area 1012 and the splicing display area 102. Since a first functional substrate 13 is disposed in the first sub-region 1011, thickness of two adjacent display panels 10 in the second sub-region 1012 and the splice display area 102 will be less than that of each display panel 10 in the first sub-region 1011 after two adjacent display panels 10 are spliced, thus the groove 103 in the second sub-region 1012 and the splicing display area 102 is formed between two adjacent display panels 10.

Further, an orthographic projection of at least one convex portion 211 on two adjacent display panels 10 covers the splicing display area 102 and the second sub-area 1012.

It can be understood that the convex lens portion 20 is located between two adjacent display panels 10, and an orthographic projection of the convex lens portion 20 on two adjacent display panels 10 may simultaneously cover the splicing display area 102 and the second sub-area 1012 of the two adjacent display panels 10. Since the second sub-area 1012 is an area where each of the display panels 10 can normally emit light, light-gathering effect of the convex lens portion 20 can be utilized to converge emitting portions in the second sub-region 1012 of two adjacent display panels 10 into a splicing display area 102, so that a splicing position of two adjacent display panels 10 can also emit light, thereby eliminating a splicing seam and improving display effects of the display module.

Wherein, the convex lens portion 20 comprises an adhesive layer 22 disposed in the groove 103 and a convex lens 21 disposed on the adhesive layer 22, at least one convex portion 211 is disposed on one side of the convex lens 21 away from the adhesive layer 22, and the convex lens 21 is attached to the groove 103 through the adhesive layer 22. In embodiments of the present application, an end portion of the convex lens 21 on one side away from the adhesive layer 22 is flush with a surface of the display panel 10 in the first sub-region 1011, so that a light-emitting surface of the display module is flat and there is no protrusion, so as to further improve display effects and yields of the display module.

Optionally, a material of the adhesive layer 22 comprises an optically clear adhesive (OCA), and a material of the convex lens 21 comprises polymethyl methacrylate, polycarbonate, polyoxymethylene, or polypropylene.

Specifically, between two adjacent display panels 10, the convex lens portion 20 is disposed on one side of the first flexible substrate 11 of two adjacent display panels 10 away from the second flexible substrate 12, one side of the adhesive layer 22 is attached to the first flexible substrate 11, and another side thereof is attached to the convex lens 21, so that the convex lens 21 is attached to the groove 103. The end portion of the convex lens 21 on one side away from the adhesive layer 22 is flush with a surface of one side of the first functional substrate 13 away from the second functional substrate 14.

In an embodiment of the present application, continuing to refer to FIG. 1, a convex portion 211 is disposed on one side of the convex lens 21 away from the adhesive layer 21, and an orthographic projection of the convex portion 211 between two adjacent display panels covers the splicing display area 102 and the second sub-area 1012.

Further, since the first flexible substrate 11 bends and extends in the splicing display area 102 along one side away from the first functional substrate 13, a depression is formed in the groove 103. In embodiments of the present application, the adhesive layer 22 is filled in the depression, and a surface of the adhesive layer 22 away from an interior side of the depression is flush with one side of the first flexible substrate 11 away from the second flexible substrate 12 and located in the second sub-area 1012, or slightly protrudes with respect to a surface of the first flexible substrate 11 on one side away from the second flexible substrate 12 and located in the second sub-region 1012, so as to provide support for the convex lens 21.

In embodiments of the present application, an end portion of the convex lens 21 on one side away from the adhesive layer 22 is flush with a surface on one side of the first functional substrate 13 on the side away from the second functional substrate 14, and the surface of the convex lens 21 on one side close to the adhesive layer 22 is a flat surface.

From the above, in an embodiment of the present application, the convex lens portion 20 is disposed between two display panels 10 that are spliced with each other, and an orthographic projection of the convex lens portion 20 on two adjacent display panels 10 covers the second sub-area 1012 and the splicing display area 102. Further, at least one convex portion 211 is disposed on the side of the convex lens portion 20 away from the display panel 10. Thus, light-gathering effect of the convex lens portion 20 can be utilized to converge light in the conventional display area 101 of the display panel into a splicing display area 102, so that a splicing position of two display panels 10 that are spliced to each other can also emit light, thereby eliminating a splicing seam and improving display effects of the display module.

Figure 2A:
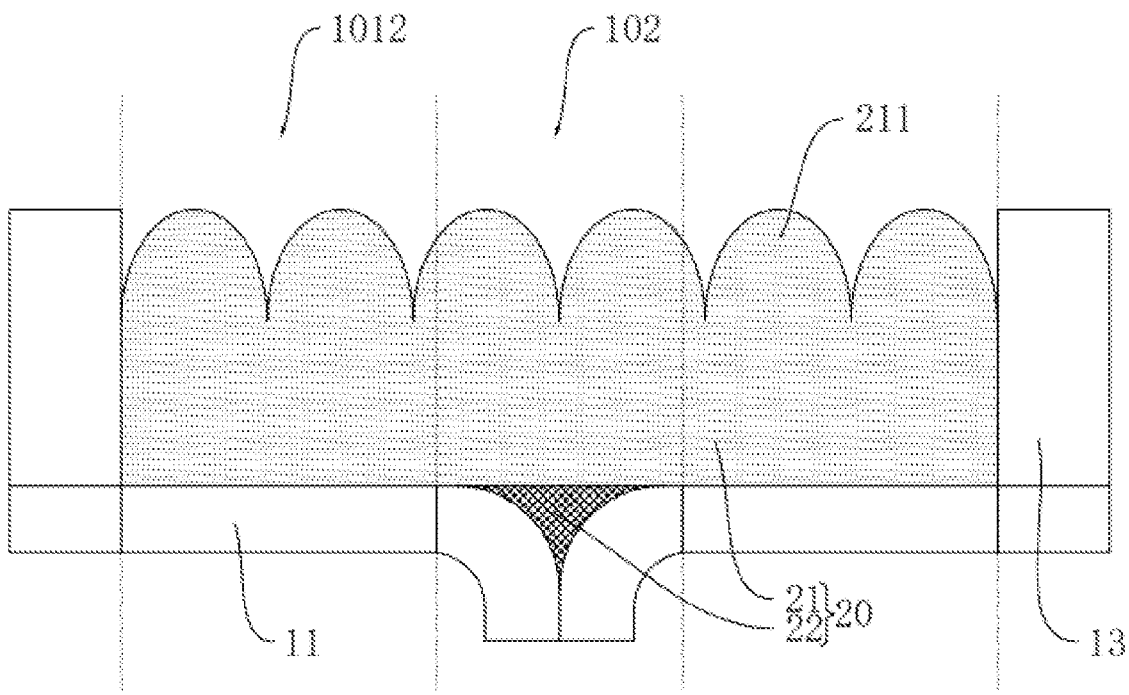
FIG. 2A is a schematic structural diagram of a convex lens portion according to an embodiment of this application.

In another embodiment of the present application, referring to FIG. 2A, this embodiment differs from the previous embodiment in that a plurality of convex portions 211 are disposed on one side of convex lens 21 away from the adhesive layer 22.

Optionally, distribution density of the plurality of the convex portions 211 gradually increases in a direction close to a splicing position between two adjacent display panels 10. As the closer to the splicing position of the two display panels 10, the less light there is, therefore, in this embodiment of the present application, by increasing the distribution density of the convex portions 211 in an area close to the splicing position of the two display panels 10, light-gathering effect in the splicing area can be improved, and amount of light in the splicing area can be improved, so that light intensity in the splicing display area 102 of the display module can be improved, thus display effect of the display module can be improved.

Figure 2B:
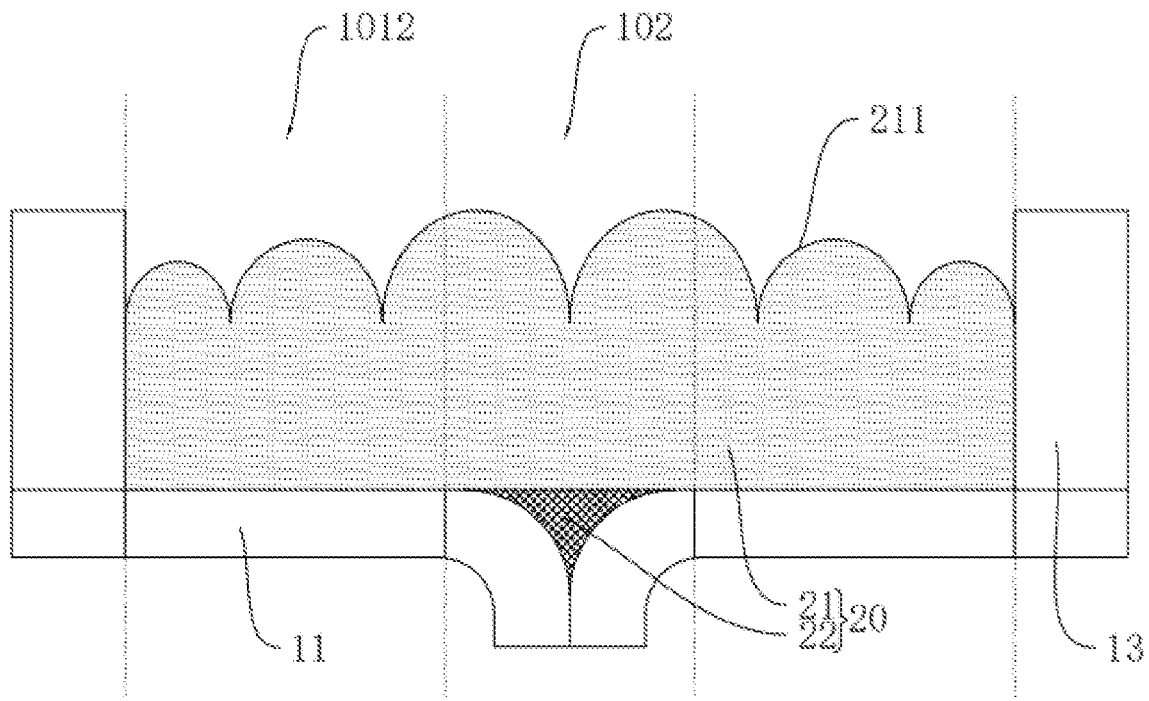
FIG. 2B is a schematic structural diagram of another convex lens portion according to an embodiment of the present application.
Figure 2C:
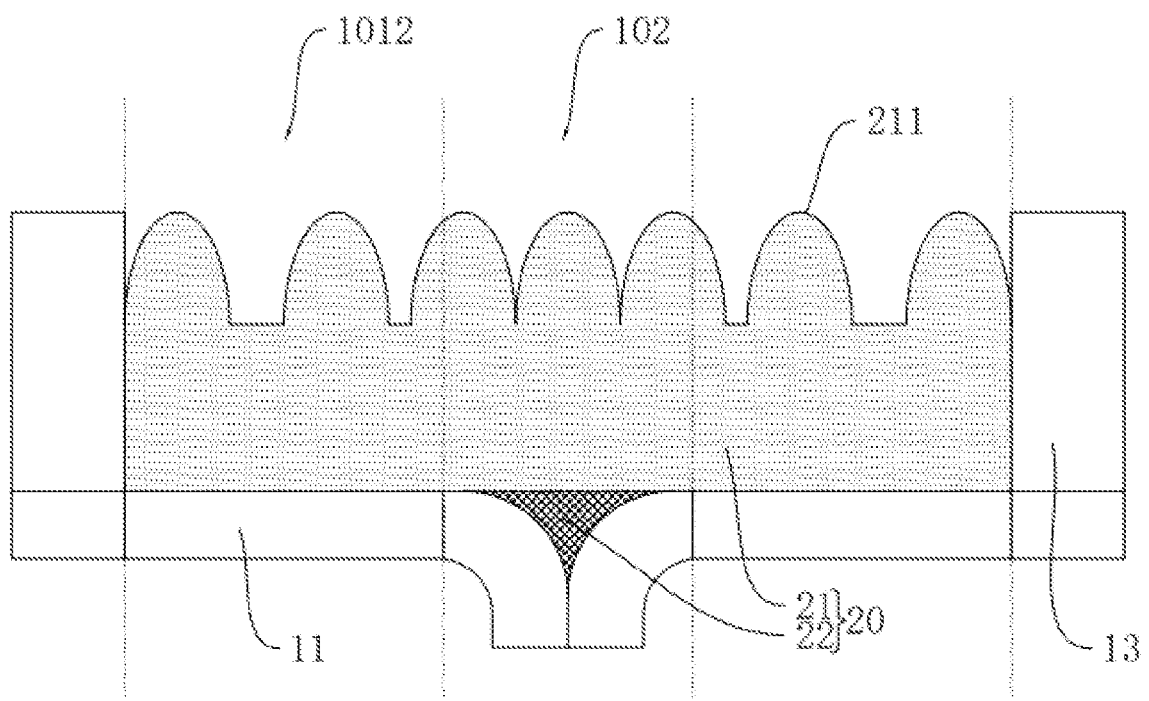
FIG. 2C is a schematic structural diagram of yet another convex lens portion according to an embodiment of the present application

For example, as shown in FIG. 2B, orthographic projection areas of the plurality of convex portions 211 on two adjacent display panels 10 gradually increase in a direction of close to a splicing position between two adjacent display panels 10, or as shown in FIG. 2C, numbers of the plurality of convex portions 211 gradually increase in a direction close to a splicing position between two adjacent display panels 10.

From the above, compared with the previous embodiment, in this embodiment, by providing a plurality of convex portions 211 instead of one convex portion 211, distribution density of the plurality of convex portions 211 can be controlled to improve uniformity of light emission in the splicing display area 102 and the second sub-area 1012, so as to improve uniformity of light emission between two adjacent display panels 10, thus improving display effect of the display module.

Figure 3:
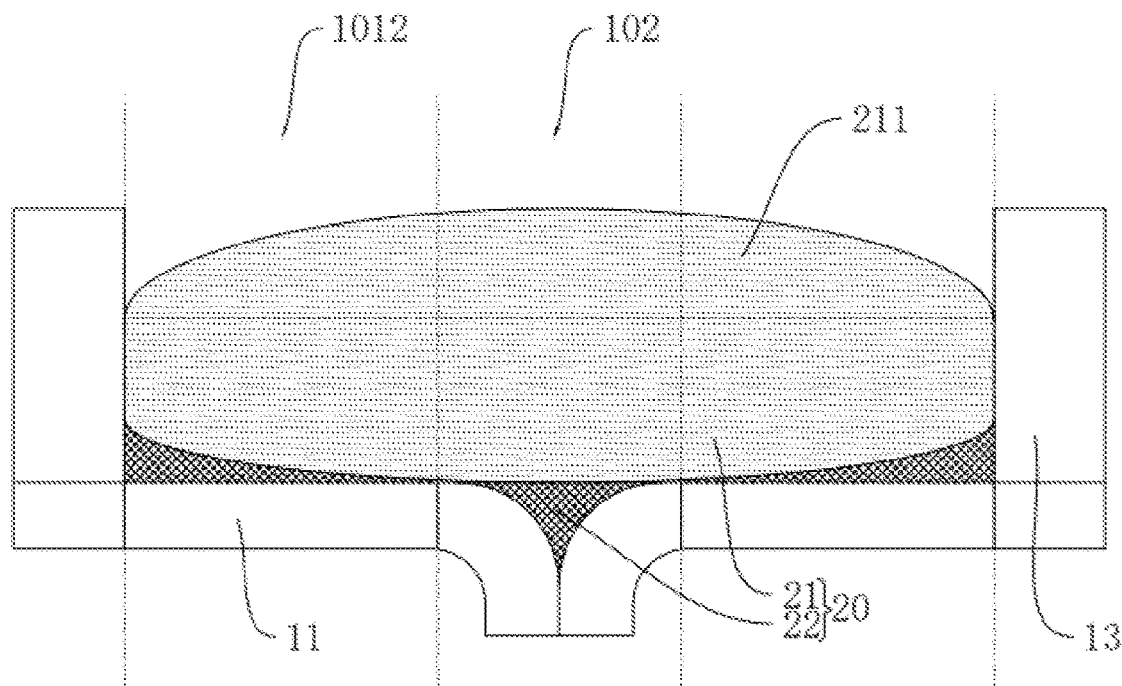
FIG. 3 is a schematic structural diagram of further another convex lens portion according to an embodiment of the present application.

In another embodiment of the present application, referring to FIG. 3, this embodiment differs from the first embodiment in that one side of the convex lens 21 close to the adhesive layer 22 is an arc surface, and the arc surface protrudes in a direction close to the adhesive layer 22, and the adhesive layer 22 is filled between the convex lens 21 and the groove 103.

From the above, compared with the first embodiment, this embodiment can increase contact areas between the convex lens 21 and the adhesive layer 22, thereby increasing adhesive strength of the convex lens 21 and yield of the display module.

Figure 4:
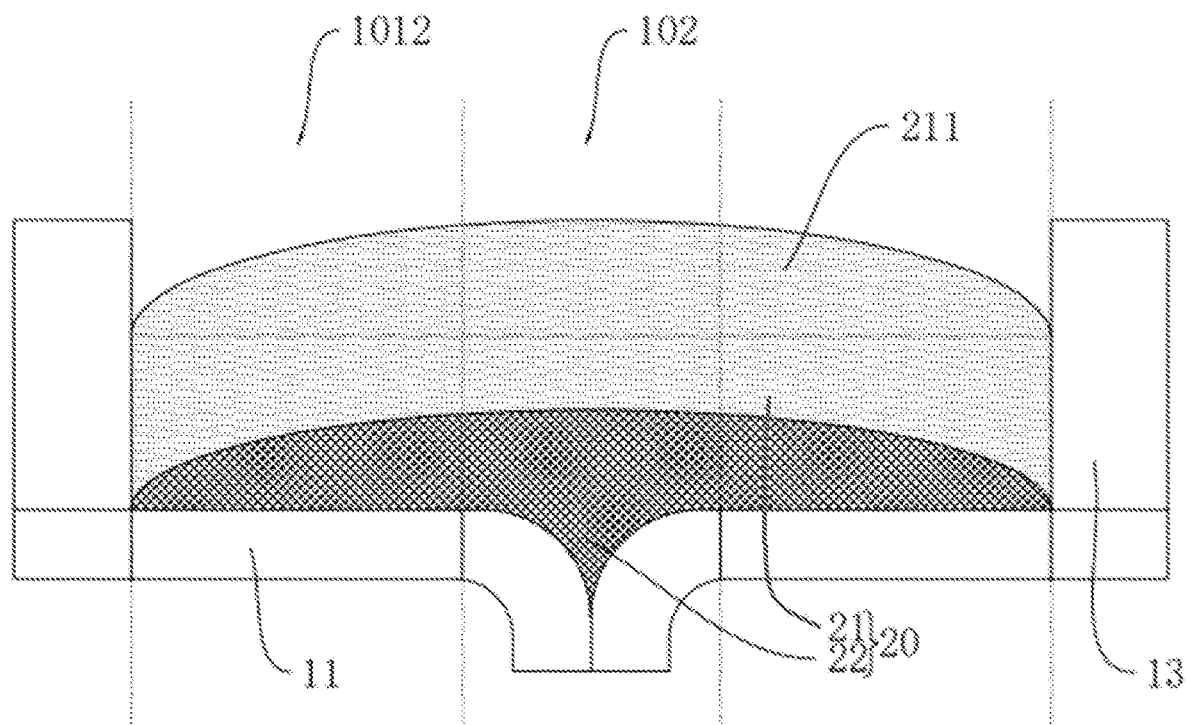
FIG. 4 is a schematic structural diagram of alternative convex lens portion according to an embodiment of the present application.

In another embodiment of the present application, referring to FIG. 4, this embodiment differs from the previous embodiment in that one side of the convex lens 21 close to the adhesive layer 22 is an arc surface, and the arc surface is concave in a direction away from the adhesive layer 22, and the adhesive layer 22 is filled between the convex lens 21 and the groove 103.

From the above, compared with the previous embodiment, this embodiment can further increase contact areas between the convex lens 21 and the adhesive layer 22, thereby further increasing adhesive strength of the convex lens 21 and yield of the display module.

Figure 5:
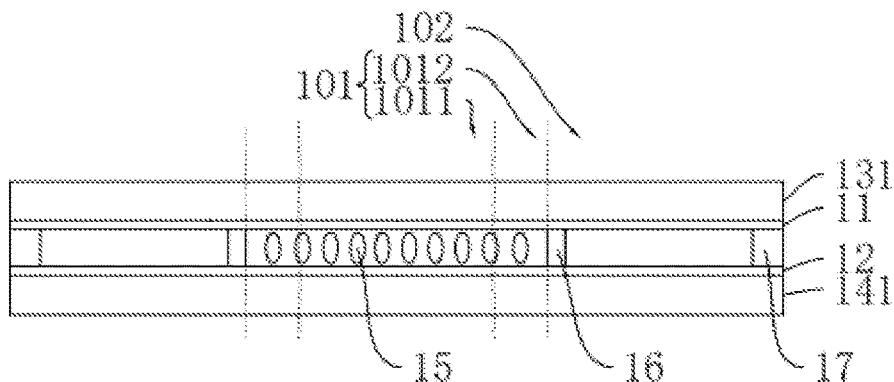
FIG. 5 is a schematic diagram of a structure of a display module in process according to an embodiment of the present application.

In addition, an embodiment of the present application further provides a method for manufacturing the display module described in the above embodiments. Combining FIGS. 1 and 5-7, wherein the display module comprises a display area, the display area comprises a conventional display area 101 of each of the display panels 10 and a splicing display area 102 between two adjacent conventional display areas 101, and the conventional display area 101 comprises a first sub-area 1011 and a second sub-area 1012 between the first sub-area 1011 and the splicing display area 102. The method for manufacturing the display module comprises the following steps:

As shown in FIG. 5, a first panel is provided, and the first panel comprises a first flexible substrate 11 and a second flexible substrate 12 disposed opposite to each other; a first motherboard 131 disposed on one side of the first flexible substrate 11 away from the second flexible substrate 12; a second motherboard 141 disposed on one side of the second flexible substrate 12 away from the first flexible substrate 11; a liquid crystal layer 15, a retaining wall 16, and a light shielding portion 17 disposed between the first flexible substrate 11 and the second flexible substrate 12.

A color filter layer, an electrode layer, an alignment layer, etc. are disposed on one side of the first flexible substrate 11 close to the second flexible substrate 12, and a thin film transistor array layer, an electrode layer, an alignment layer, etc are disposed on one side of the second flexible substrate 12 close to the first flexible substrate 11.

In embodiments of the present application, the retaining wall 16 is disposed on one side of the splicing display area 102 close to the conventional display area 101 to limit the liquid crystal layer 15 within the conventional display area 101. The retaining wall 16 may be made of sealant, at the time of limiting the liquid crystal layer 15, the first flexible substrate 11 and the second flexible substrate may be bonded together; or the retaining wall may be made of other organic resin materials, and sealant can be disposed on one side of the retaining wall 16 to bond the first flexible substrate 11 and the second flexible substrate 12. The light shielding portion 17 may be made of a black photoresist material, which may further serve to prevent light leakage and prevent foreign matter from entering the display panel 10.

Figure 6:
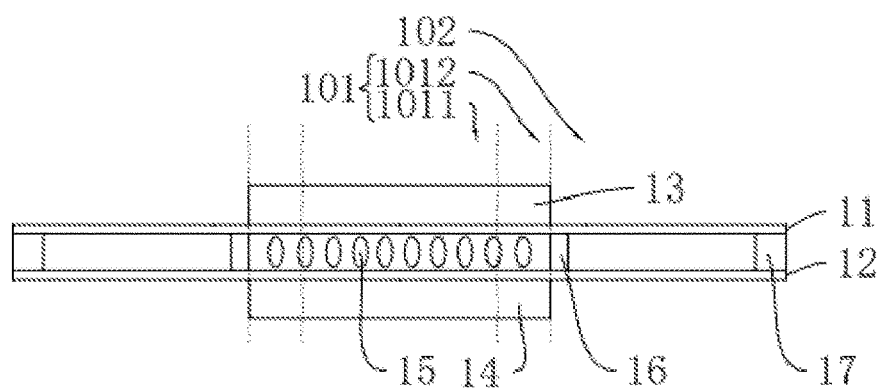
FIG. 6 is a schematic diagram of a structure of another display module in process according to an embodiment of the present application.

Then, as shown in FIGS. 5 and 6, the first motherboard 131 and the second mother board 141 are subjected to cutting, that is, portions of the first motherboard 131 and the second motherboard 141 located outside the first sub-region 1011 are cut and removed to obtain a first glass substrate located on one side of the first flexible substrate 131 away from the second flexible substrate 12 and located in the first sub-region 1011, and a second glass substrate located on one side of the second flexible substrate 12 away from the first flexible substrate 11 and located in the second sub-region 1012.

Next, a first polarizer may be attached on one side of the first glass substrate away from the first flexible substrate 11 to obtain the first functional substrate 13, and a second polarizer may be attached on the second glass substrate away from the second flexible substrate 12 to obtain the second functional substrate 14.

Figure 7:
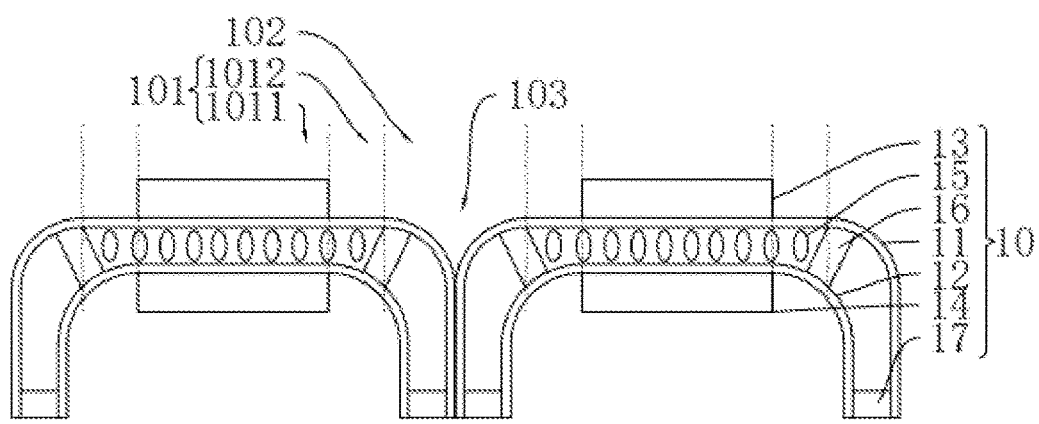
FIG. 7 is a schematic diagram of a structure of yet another display module in process according to an embodiment of the present application.

Then, as shown in FIG. 7, portions of the first flexible substrate 11 and the second flexible substrate 12 located in the splicing display area 102 in each display panel 10 are bent in a direction away from the first functional substrate 13, and two adjacent display panels 10 are spliced together (as shown in FIG. 5). Wherein, since the first functional substrate 13 is located only in the first sub-region 1011, and further, after the adjacent two display panels 10 are spliced together, grooves 103 are formed in the second sub-region 1012 and the splicing display region 102. Further, since the first flexible substrate 11 and the second flexible substrate 12 are bent in the splicing display region 102, a depression is formed at a splicing position of two adjacent display panels 10, that is, the depression is formed at bottom of the groove 103.

Next, as shown in FIG. 1, an adhesive layer 22 is formed at the bottom of the groove 103, and the adhesive layer 22 is filled in the depression, and may protrude from a surface of the first flexible substrate 11 away from the second flexible substrate 12, and a material thereof comprises an optically clear adhesive (OCA).

A convex lens 21 is formed in the groove 103, and the convex lens 21 is attached to the groove 103 through the adhesive layer 22 to form a display module. An end portion of the convex lens 21 on one side away from the adhesive layer 22 is flush with a surface of the first functional substrate 13 on one side away from the second functional substrate 14.

In addition, an embodiment of the present application further provides a display device, the display device comprises the display module described in the above embodiments and the display module prepared by using the method for manufacturing the display module described in the above embodiments.

The display device further comprises a backlight assembly (not shown in the figures) disposed on one side of the display module, the backlight assembly is disposed on one side of the display panel 10 away from the convex lens portion 20, and at least corresponding to the conventional display area 101, the backlight assembly is disposed on one side of the display panel 10 away from the convex lens portion 20 to provide backlight for the display panel 10.

In the above embodiments, descriptions of each embodiment have its own emphasis. For parts that are not detailed in one embodiment, please refer to the related descriptions of other embodiments.

The display module and display device provided in embodiments of the present application are described in detail above. The principles and embodiments of the present application are described by using specific examples herein. Descriptions of the above embodiments are merely intended to help understand the technical solutions and core ideas of the present application. A person skilled in the art shall understand that it is still possible to modify the technical solutions described in the above embodiments, or equivalently substitute some of the technical features thereof. However, these modifications or substitutions do not make the essence of the corresponding technical solutions depart from scopes of the technical solutions of each embodiment of the present application.

What is claimed is:

1. A display module, wherein the display module comprises at least two display panels, two adjacent display panels are spliced along a first direction or a second direction, and the first direction is different from the second direction;
the display module comprises a display area comprising a conventional display area of each of the display panels and a splicing display area between two adjacent conventional display areas, and the conventional display area comprises a first sub-area and a second sub-area between the first sub-area and the splicing display area;
the display module further comprises a groove disposed between two adjacent display panels and located in the second sub-region and the splicing display area, and a convex lens portion disposed in the groove;
wherein at least one convex portion is disposed on one side of the convex lens portion away from bottom of the groove, and an orthographic projection of the convex lens portion on two adjacent display panels covers the second sub-area and the splicing display area wherein the convex lens portion comprises an adhesive layer disposed in the groove and a convex lens disposed on the adhesive layer;
wherein each of the display panels comprises a first flexible substrate and a second flexible substrate disposed opposite to each other, a first functional substrate disposed on one side of the first flexible substrate away from the second flexible substrate and located in the first sub-region, and a second functional substrate disposed on one side of the second flexible substrate away from the first flexible substrate and located in the first sub-region; and
wherein the first flexible substrate and the second flexible substrate are disposed in the conventional display area and extend to the splicing display area, the convex lens portion is disposed on one side of the first flexible substrate away from the second flexible substrate, and the end portion of the convex lens on one side away from the adhesive layer is flush with a surface of one side of the first functional substrate away from the second functional substrate.

2. The display module according to claim 1, wherein an orthographic projection of at least one convex portion on two adjacent display panels covers the second sub-area and the splicing display area.

3. The display module according to claim 2, wherein the convex lens portion is disposed with a plurality of convex portions on one side away from bottom of the groove, and distribution density of the plurality of convex portions gradually increases in a direction close to a splicing position between the two adjacent display panels.

4. The display module according to claim 1, wherein the convex lens is attached to the groove through the adhesive layer, and the convex lens is disposed with at least one convex portion on one side away from the adhesive layer.

5. The display module according to claim 1, wherein an end portion of the convex lens on one side away from the adhesive layer is flush with a surface of the display panel in the first sub-region.

6. The display module according to claim 1, wherein each of the display panels further comprises a liquid crystal layer and a retaining wall disposed between the first flexible substrate and the second flexible substrate; and
wherein parts of the first flexible substrate and the second flexible substrate in the splicing display area bend and extend in a direction away from the first functional substrate, and the retaining wall is disposed on one side of the splicing display area close to the conventional display area, so that the liquid crystal layer is disposed in the conventional display area.

7. The display module according to claim 1, wherein one side of the convex lens close to the adhesive layer is a flat surface or an arc surface.

8. The display module according to claim 1, wherein a material of the convex lens comprises polymethyl methacrylate, polycarbonate, polyoxymethylene, or polypropylene.

9. A display device, wherein the display device comprises a display module and a backlight assembly, the display module comprises at least two display panels, two adjacent display panels are spliced along a first direction or a second direction, and the first direction is different from the second direction;
the display module comprises a display area comprising a conventional display area of each of the display panels and a splicing display area between two adjacent conventional display areas, and the conventional display area comprises a first sub-area and a second sub-area between the first sub-area and the splicing display area;
the display module further comprises a groove disposed between two adjacent display panels and located in the second sub-region and the splicing display area, and a convex lens portion disposed in the groove;
wherein at least one convex portion is disposed on one side of the convex lens portion away from bottom of the groove, and an orthographic projection of the convex lens portion on two adjacent display panels covers the second sub-area and the splicing display area;
wherein the convex lens portion comprises an adhesive layer disposed in the groove and a convex lens disposed on the adhesive layer;
wherein each of the display panels comprises a first flexible substrate and a second flexible substrate disposed opposite to each other, a first functional substrate disposed on one side of the first flexible substrate away from the second flexible substrate and located in the first sub-region, and a second functional substrate disposed on one side of the second flexible substrate away from the first flexible substrate and located in the first sub-region; and
wherein the first flexible substrate and the second flexible substrate are disposed in the conventional display area and extend to the splicing display area, the convex lens portion is disposed on one side of the first flexible substrate away from the second flexible substrate, and the end portion of the convex lens on one side away from the adhesive layer is flush with a surface of one side of the first functional substrate away from the second functional substrate; and
the backlight assembly is disposed on one side of the display panel away from the convex lens portion.

10. The display module according to claim 9, wherein an orthographic projection of at least one convex portion on two adjacent display panels covers the second sub-area and the splicing display area.

11. The display module according to claim 10, wherein the convex lens portion is disposed with a plurality of convex portions on one side away from bottom of the groove, and distribution density of the plurality of convex portions gradually increases in a direction close to a splicing position between the two adjacent display panels.

12. The display module according to claim 9, wherein the convex lens is attached to the groove through the adhesive layer, and the convex lens is disposed with at least one convex portion on one side away from the adhesive layer.

13. The display module according to claim 9, wherein an end portion of the convex lens on one side away from the adhesive layer is flush with a surface of the display panel in the first sub-region.

14. The display module according to claim 9, wherein each of the display panels further comprises a liquid crystal layer and a retaining wall disposed between the first flexible substrate and the second flexible substrate; and wherein parts of the first flexible substrate and the second flexible substrate in the splicing display area bend and extend in a direction away from the first functional substrate, and the retaining wall is disposed on one side of the splicing display area close to the conventional display area, so that the liquid crystal layer is disposed in the conventional display area.

15. The display module according to claim 9, wherein one side of the convex lens close to the adhesive layer is a flat surface or an arc surface.

16. The display module according to claim 9, wherein a material of the convex lens comprises polymethyl methacrylate, polycarbonate, polyoxymethylene, or polypropylene.

17. A display module, wherein the display module comprises at least two display panels, two adjacent display panels are spliced along a first direction or a second direction, and the first direction is different from the second direction;

the display module comprises a display area comprising a conventional display area of each of the display panels and a splicing display area between two adjacent conventional display areas, and the conventional display area comprises a first sub-area and a second sub-area between the first sub-area and the splicing display area;

the display module further comprises a groove disposed between two adjacent display panels and located in the second sub-region and the splicing display area, and a convex lens portion disposed in the groove;

wherein at least one convex portion is disposed on one side of the convex lens portion away from bottom of the groove, and an orthographic projection of the convex lens portion on two adjacent display panels covers the second sub-area and the splicing display area;

wherein the convex lens portion comprises an adhesive layer disposed in the groove and a convex lens disposed on the adhesive layer, and the convex lens is attached to the groove through the adhesive layer, and the convex lens is disposed with at least one convex portion on one side away from the adhesive layer;

wherein an end portion of the convex lens on one side away from the adhesive layer is flush with a surface of the display panel in the first sub-region;

wherein each of the display panels comprises a first flexible substrate and a second flexible substrate disposed opposite to each other, a first functional substrate disposed on one side of the first flexible substrate away from the second flexible substrate and located in the first sub-region, and a second functional substrate disposed on one side of the second flexible substrate away from the first flexible substrate and located in the first sub-region; and wherein the first flexible substrate and the second flexible substrate are disposed in the conventional display area and extend to the splicing display area, the convex lens portion is disposed on one side of the first flexible substrate away from the second flexible substrate, and the end portion of the convex lens on one side away from the adhesive layer is flush with a surface of one side of the first functional substrate away from the second functional substrate.

* * * * *